Aug. 29, 1967  K. MEIER  3,337,884
SEAT CUSHION FOR AUTOMOTIVE VEHICLES
Filed Feb. 23, 1965  2 Sheets-Sheet 1
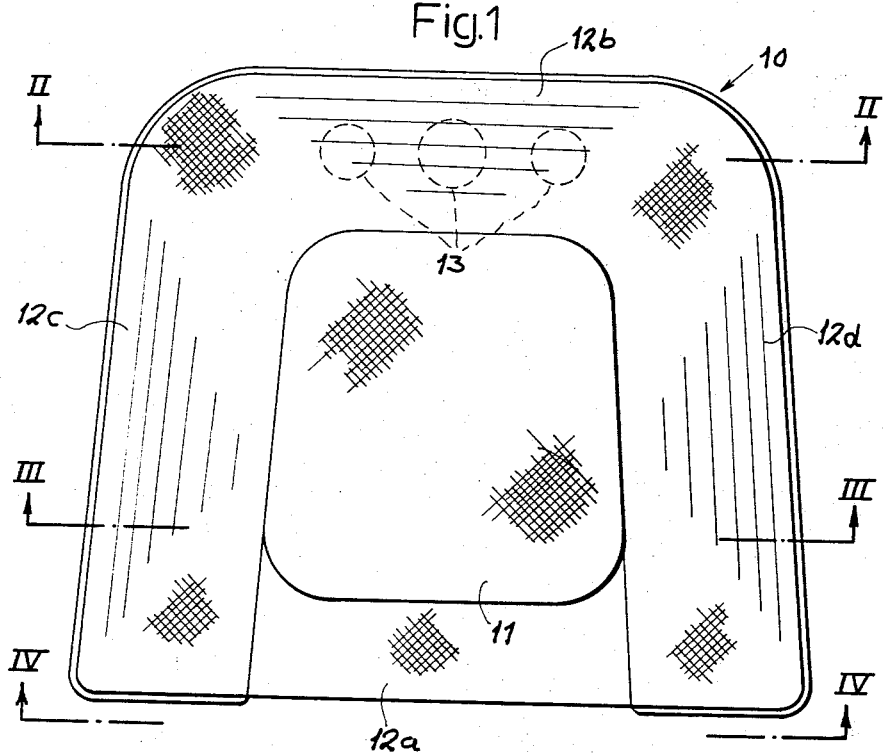
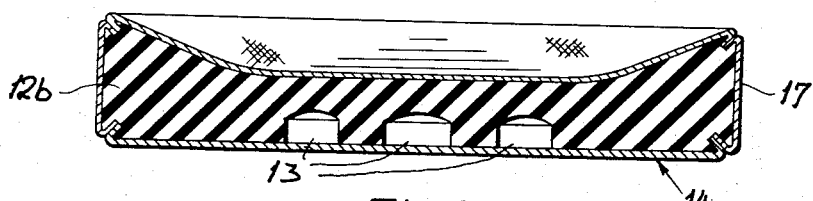
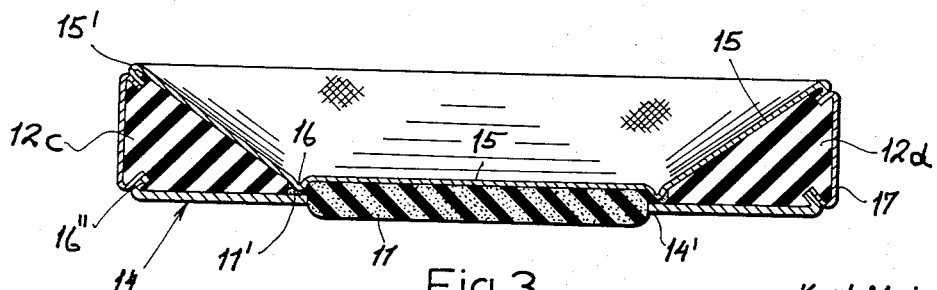
Karl Meier
INVENTOR.
BY Karl G. Ross
Attorney Aug. 29, 1967  K. MEIER  3,337,884
SEAT CUSHION FOR AUTOMOTIVE VEHICLES
Filed Feb. 23, 1965  2 Sheets-Sheet 2
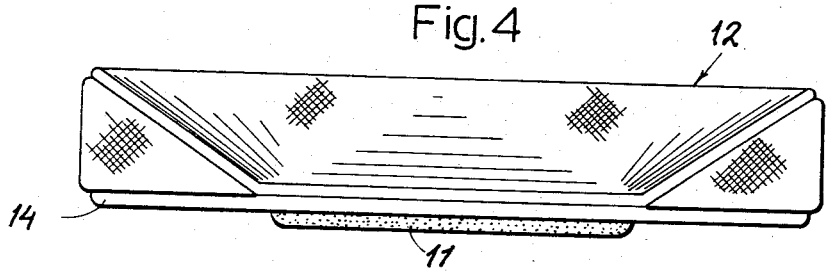
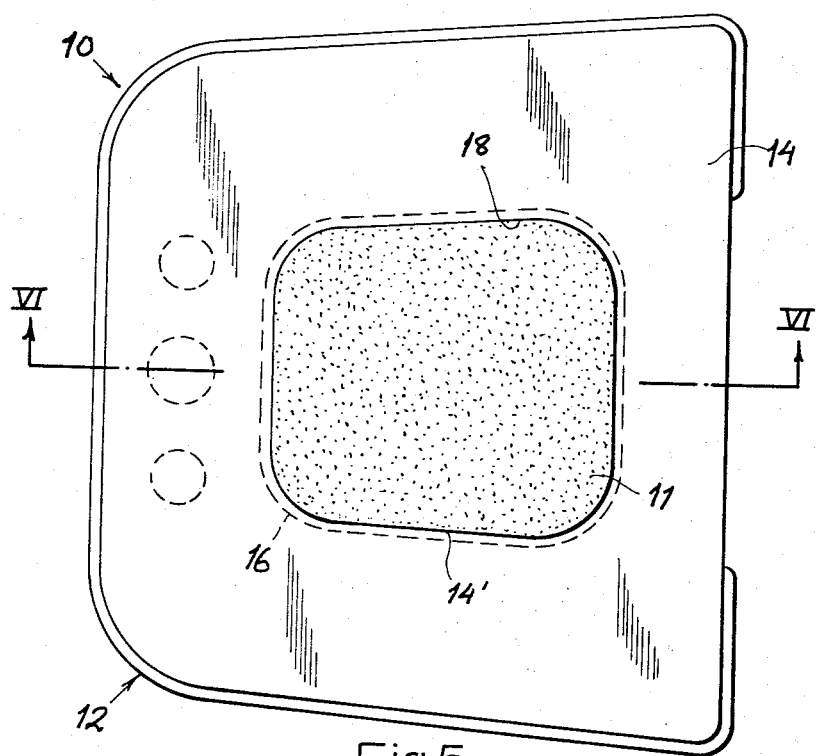
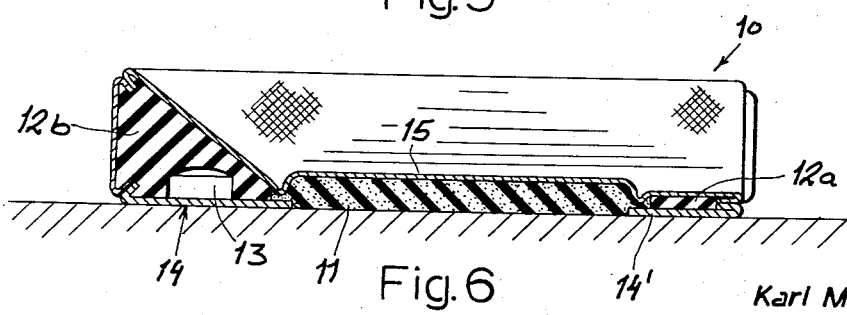
Karl Meier
INVENTOR.
BY
Karl F. Ross
Attorney

United States Patent Office 3,337,884
Patented Aug. 29, 1967

3,337,884
SEAT CUSHION FOR AUTOMOTIVE VEHICLES
Karl Meier, Wolfsburg, Germany, assignor to Kamei-Autokomfort, Wolfsburg, Germany, a corporation of Germany
Filed Feb. 23, 1965, Ser. No. 434,413
Claims priority, application Germany, Feb. 22, 1964, K 52,181, K 52,182
7 Claims. (Cl. 5—345)

My present invention relates to a seat cushion adapted to be used in automotive vehicles in order to increase the comfort of their occupants.

The great majority of automotive vehicles on the market today are equipped with bench-type seats which afford a bare minimum of comfort to the driver and the passengers. Only certain sports cars and other expensive models are provided with individual bucket seats which offer greater convenience to the driver and a front passenger but, at the same time, prevent the seating of a third rider between the other two. Moreover, existing car seats do not invariably satisfy the requirement for maximum comfort coupled with sufficient mobility, especially in the case of the driver, to permit free maneuvering and handling of the controls. One drawback of known vehicular seating arrangements is, for example, the fact that the rump of the user is settled in a concavity of a supporting surface while the undersides of the thighs bear upon a front ledge bounding this cavity, a prolonged maintenance of such a position causing discomfort at the legs and, in aggravated cases, even impeding blood circulation to the lower limbs. Another inconvenience of conventional automobile seats lies in the fact that they fail to support the rider at the lower end of the spine, thus in the region where such support is particularly desirable on extended trips.

It is, therefore, the general object of my present invention to provide an improved vehicular seat which avoids the aforementioned drawbacks.

A more specific object of this invention is to provide a seat cushion removably fitting on a conventional, e.g. bench-type, automotive seat so that it can be readily taken off in order to accommodate an additional passenger.

It is also an object of this invention to provide a removable seat cushion which, when occupied by a user, will firmly adhere to its underlying supporting surface so as not to shift its position during travel.

A seat cushion according to my invention, designed to satisfy the above objects, comprises a generally trapezoidal seat surrounded by a frame attached thereto, this frame having a front portion which is substantially level with the seat and further having rear and side portions rising above the seat surface; the side portions, which laterally support the thighs of the user, diverge forwardly along nonparallel sides of the trapezoidal seat to afford the necessary mobility to the user's legs, e.g. for operation of the vehicular pedals.

The trapezoidal seat proper, according to a more specific feature of my invention, is a pad of highly compressible resilient material, preferably of foam rubber or other elastomeric foam material, which is stitched along its circumference to the surrounding frame and, advantageously, is overlain by a flexible and resilient covering, such as an elastic fabric, also extending over the upper frame surface. The frame itself may have a bottom plate of stiff yet flexible material (e.g., cardboard) which slightly projects inwardly into the frame opening to form a ledge for the pad, the latter being stitched onto this ledge and the overlying flexible covering which in turn is fastened to the outer periphery of the frame. The pad, accordingly, can bulge out of the frame opening through the bottom plate into firm frictional engagement with its supporting surface when loaded by the weight of the user. The rising rear and side portions of the frame, according to still another feature of my invention, are of generally triangular cross-section and slope down toward the central seat portion or pad, thereby providing firm support for the buttocks and the thighs of the occupant. Since the front portion of the frame is shallow and advantageously slightly lower than the seat proper, no objectionable circulation-impeding pressure is experienced along the lower thighs.

The invention will be described in greater detail with reference to the accompanying drawing in which:

FIG. 1 is a top plan view of a seat cushion embodying my invention;

FIGS. 2 and 3 are cross-sectional views taken on the lines II—II and III—III, respectively, of FIG. 1;

FIG. 4 is a front-elevational view taken on line IV—IV of FIG. 1;

FIG. 5 is a bottom view of the seat cushion shown in FIGS. 1-4; and

FIG. 6 is a cross-sectional view taken on line VI—VI of FIG. 5.

The seat cushion shown in the drawing comprises a central pad 11, of elastomeric foam material, which is of generally trapezoidal shape so that its nonparallel sides diverge toward the front. The pad 11, whose upper surface constitutes the seat proper of the cushion 10, is closely surrounded by a frame 12 having a front portion 12a, a rear portion 12b and diverging side portions 12c and 12d. As best seen in FIGS. 3 and 6, the front portion 12a of the frame has a height somewhat less than that of the pad 11 whereas the remaining frame portions 12b, 12c and 12d rise to a considerable extent above the surface pad, these three frame portions having triangular cross-sections and sloping downwardly toward the center of the frame accommodating the pad 11. As will be seen from FIG. 6, in which the cushion 10 is shown resting on a flat support 20 such as an automobile bench, the unloaded pad 11 rises slightly above the front portion 12a so that the legs of the user, dangling across this front portion, are not under pressure along the undersides of the thighs. The rear frame portion 12b, supporting the lower spine of the user, is shown recessed at 13 to increase its inherent resiliency; thus, the frame 12 may consist of solid rubber which is less highly compressible than the foam elastomer constituting the pad 11.

Frame 12 is provided with a base plate 14 which, as best seen in FIGS. 3 and 6, projects inwardly beyond the inner frame periphery into the trapezoidal frame opening to form a ledge 14' which supports a marginal zone 11' of pad 11. A flexible covering 15, such as an elastic fabric, overlies the frame 12 and the pad 11 to which it is fastened by stitching 16 which traverses the marginal zone 11' of the pad as well as the underlying ledge 14', thereby combining the various elements into a unitary structure. It will be noted that fabric 15 and base plate 14 have peripheral edges 15', 16" bent over and tucked into grooves of frame portions 12a–12d, these frame portions being further enclosed by a peripheral strip 17 of flexible material (e.g. similar to the fabric 15) also tucked into peripheral grooves of the frame.

The bottom opening 18 defined by the peripheral ledge 14' of base plate 14 allows the major part of the pad 11 to protrude downwardly, e.g. as shown in FIGS. 3 and 4, so that the foam material thereof is forced into firm contact with its supporting surface (20, FIG. 6) when the pad is compressed by the weight of a user. The resulting increase in friction between the seat cushion 10 and the support 20 prevents any undesired shifting of the cushion. The overall proportions of the seat cushion are such that its horseshoe-shaped and wedgelike frame portions 12b, 12c, 12d help carry the buttocks and thighs of the user, with welcome support given to the lower region of the spine by the central part of rear portion 12b whose elasticity has been increased by the cavities 13.

If the pad 11 requires repair or replacement, it can be readily extracted through opening 18 upon removal of the seam 16, this opening also serving for the reinsertion of the reconditioned or substitute pad.

The low height of the body-supporting parts of the seat cushion, including the pad 11 and the front portion 12a, avoids the need for any major adjustments when the cushion is placed on the original driver's seat of a conventional automotive vehicle.

Modifications of the specific structure described and illustrated, along with substitution of other materials for those particularly selected above, are of course possible without departing from the spirit and scope of my invention except as otherwise limited in the appended claims.

I claim:

1. A seat cushion for automotive vehicles, comprising a generally trapezoidal pad of resilient material and a frame surrounding said pad in fixedly connected relationship therewith, said frame having a front portion substantially level with said pad and a rear and side portions rising above said pad, said side portions diverging forwardly along nonparallel sides of the trapezoid for laterally supporting a user's thighs, said frame being provided with a base plate projecting inwardly beyond the inner frame periphery for forming a peripheral supporting ledge for said pad while leaving a central bottom opening through which said pad may protrude, said frame having marginal portions resting on said ledge.

2. A seat cushion for automotive vehicles, comprising a generally trapezoidal pad of resilient material and a frame surrounding said pad in fixedly connected relationship therewith, said frame having a front portion substantially level with said pad and rear and side portions of generally triangular cross-section rising above said pad and sloping down toward the latter, said side portions diverging forwardly along nonparallel sides of the trapezoid for laterally supporting a user's thighs said frame being provided with a base plate projecting inwardly beyond the inner frame periphery for forming a peripheral supporting ledge for said pad while leaving a central bottom opening through which said pad may protrude, said frame having marginal portions resting on said ledge.

3. A seat cushion as defined in claim 2, further comprising a flexible and elastic covering overlying said frame and said pad, the latter being secured to said frame by stitching penetrating said ledge, said covering and a marginal zone of said pad.

4. A seat cushion as defined in claim 3 wherein said frame consists of elastic material, said base plate consisting of inelastic yet flexible material.

5. A seat cushion as defined in claim 4 wherein said frame is recessed in the lower region of its rear portion for increasing its elasticity.

6. A seat cushion as defined in claim 5 wherein said pad consists of a material more highly compressible than that of said frame, the height of said pad exceeding that of said front portion.

7. A seat cushion as defined in claim 6 wherein said pad consists of foam elastomer.

References Cited

UNITED STATES PATENTS

| 3,083,054 | 3/1963 | Weaver | 297—219 |
| 3,111,689 | 11/1963 | Mulhauser | 5—345 |
| 3,139,308 | 6/1964 | Hershberger et al. | 297—461 |

DAVID J. WILLIAMOWSKY, *Primary Examiner.*

FRANK B. SHERRY, *Examiner.*

A. CALVERT, *Assistant Examiner.*